United States Patent Office 2,811,077
Patented Oct. 29, 1957

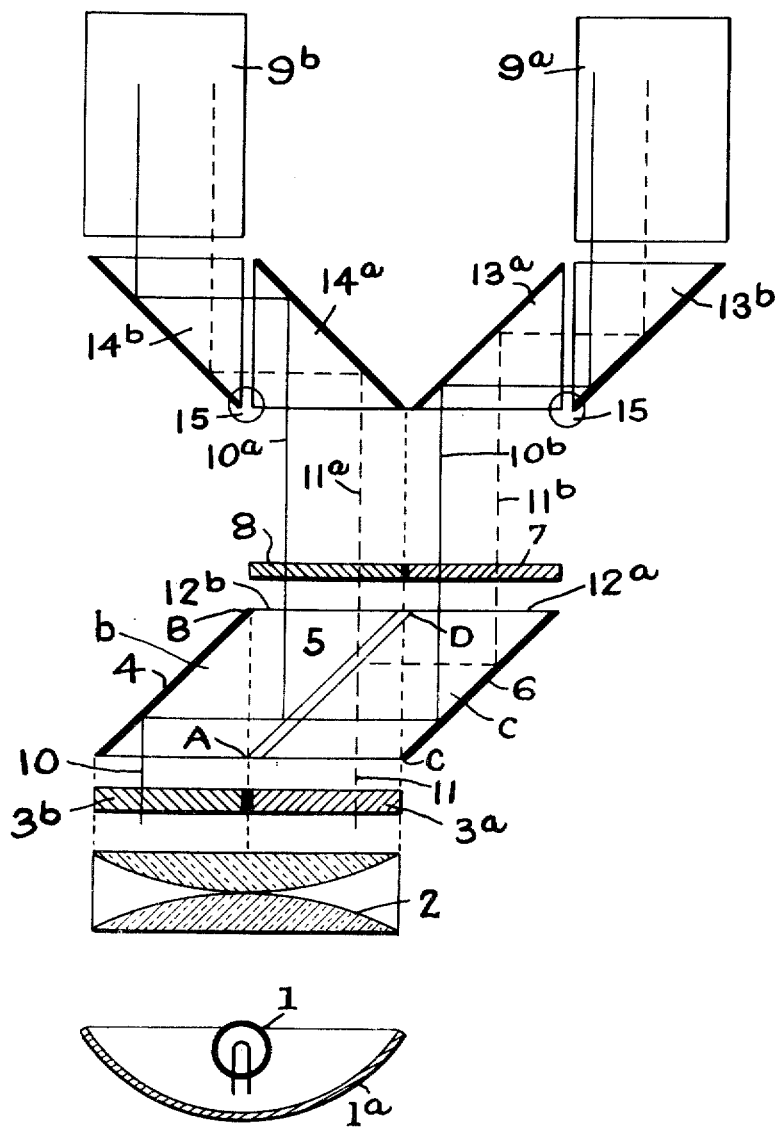

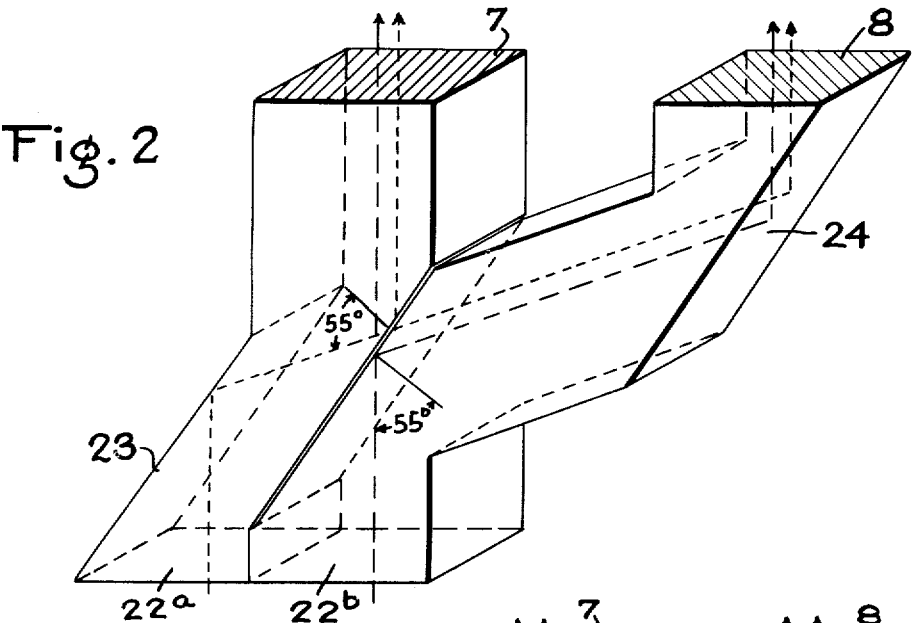
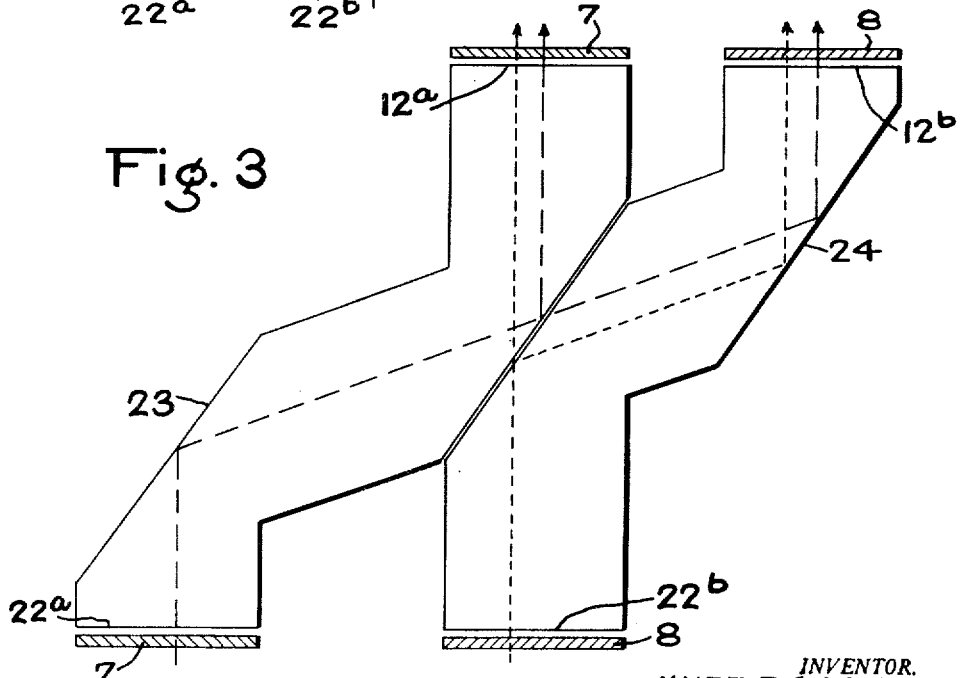

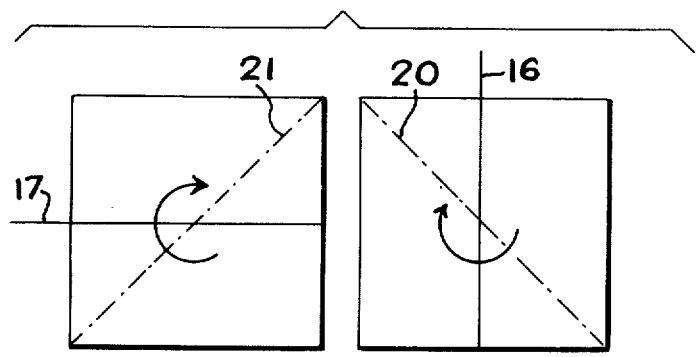
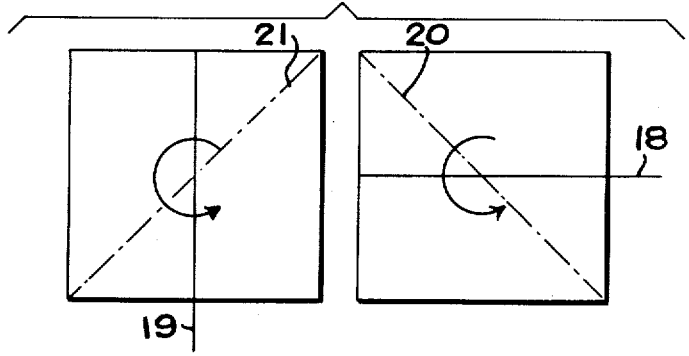

2,811,077

STEREO PROJECTION APPARATUS

Kurt Franz Gustav Wiemer, Bad Tolz, and Paul Eduard August Wiemer, Rottach-Egern, Germany, assignors to Pola-Lux Gesellschaft für Blendschutz und Raumbildprojektion mit beschränkter Haftung, Dusseldorf, Germany, a corporation of Germany Application August 13, 1952, Serial No. 304,144

Claims priority, application Germany August 21, 1951

6 Claims. (Cl. 88—16.6)

The present invention relates to new and improved apparatus for projecting so called stereo pictures by means of polarized light.

It has been known for many years to project stereoimages by means of polarized light. The polarizers used in such processes are of a number of common materials, such as, for example, various treated cellulose layers such as those known under the trade name "Polariod." The projected pictures of this type are viewed utilizing a pair of glasses of the same general variety as the projecting polarizers. In general, all these prior art processes are characterized by the loss of a large amount of light corresponding to the proportion of the original light either absorbed or reflected by the linear polarizers used. This loss of light has necessitated the use of unnecessarily large light sources, and in many cases has caused difficulty from the heat given off by the sources. Furthermore, complicated means were required for superposing the polarized light beams coming from the two stereo pictures.

It is an object of the present invention to overcome the above and related disadvantages of the prior art apparatus for projecting stero pictures. A further object is to produce new and improved apparatus for the projection of stereoimages. These and other related objects of the invention, as well as the advantages of it, will be apparent from this specification, the appended claims and the accompanying drawings, in which:

Fig. 1 illustrates schematically the optical parts of a projection device in accordance with the invention;

Fig. 2 is a view of a modified interference polarizer which can be employed with the invention;

Fig. 3 is a schematic view of another modified interference polarizer;

Fig. 4 diagrammatically indicates the polarization planes of the light resolved from a single steroimage; and Fig. 5 shows the same polarization planes for a second stereoimage.

In accordance with this invention the light coming through the individual frames of a stereo picture is separated by means of an interference polarizer, which is preferably of the reflection variety, into two linearly polarized beams which are transmitted through separate projection lenses on to the projection screen. Preferably the two transmitted and reflected light beams from the polarizer are circularly polarized prior to their passage through a projection lens in order that they can reinforce each other upon the final screen. By this expedient images are obtained which possess up to 99% of the original light intensity, whereas beams projected in accordance with the prior art linear polarizers when projected suffer a substantial loss in light intensity. It will be realized by those skilled in the art that inasmuch as two stereo prisms are necessary to project a composite stereo picture, two linear reflection polarizers are employed, one for each individual frame. In the preferred construction of the invention the transmitted and reflected beams from both of the individual frames are combined in such a manner that only two projection lenses are required.

The type of construction referred to in the preceding paragraphs will be most conveniently understood by reference to Fig. 1 of the drawings. Here stereo frames 3a and 3b are projected through lenses 9a and 9b by means of light emitted from a source 1 and reflected with the usual reflector 1a. This light, prior to its passage through the stereo picture being projected, is passed through a condensing lens 2 in the normal manner. The polarizer employed directly in front of the stereo frame consists of two glass prisms b and c joined together at a common polarizing layer AD so as to obtain a common polarizing surface. This layer may be formed of vaporizing zinc sulfide and cryolite upon the opposed faces of the prisms and then cementing these faces together. The external edges 4 and 6 positioned parallel to the polarizing layer AD are treated as by metallizing so as to form totally reflecting surfaces.

The light passing through a single stereo frame 3a is for convenience designated by the beam 11. This beam enters the composite polarizer 5 at right angles to the entrance surface of the prism c, and continues passing through it until it strikes the interfacial layer A—D. At this point it is separated into two separate beams 11a and 11b corresponding to the linearly polarized transmitted and reflected beams obtained with an interference polarizer. Beam 11a is carried out through the face 12b of the prism, passing straight through the linear polarizer. Beam 11b, the contrast to this, is reflected by the interfacial layer A—D to the mirror surface 6 and thence out through the surface 12a of the polarizer.

The light passing through the stereo frame 3b is for convenience designated by the single line 10. This light is reflected by the mirror surface 4 against the interfacial layer A—D. At this point the wholly reflected beam is separated into two components 10a and 10b, 10a being created by reflection at the interfacial layer, and 10b resulting from a passage of the initial beam through this layer. This last beam is reflected off the mirror surface 6 so as to be projected through the surface 12a, whereas beam 10a was reflected A—D so as to pass through the surface 12b as a transmitted beam The light beams designated by the lines 10a and 11a are superposed to each other at said layer A—D. Also the light beams designated by the lines 10b and 11b are superposed to each other at said layer.

Once these four separate beams have been transmitted through the polarizer 5 they are passed through two quarter wave plates 7 and 8 of mica, cellulose hydrate, or the like, positioned in such a manner that their optical axes are at right angles to one another, forming an angle of 45° with the polarization planes of the perpendicular linearly polarized beams 10a, 10b and 11a, 11b resulting from the composite polarizer 5. These two quarter wave plates 7, 8 are effective to circularly polarize the two beams projecting through one in a clockwise and the other in a counterclockwise direction in such a manner that the individual beams coming from a single projection picture reinforce each other upon a stereo screen.

This is most conveniently illustrated with reference to Figures 4 and 5 of the drawings. In these figures lines 20 represent the optical axis of the plate 7, and lines 21 represent the optical axis of the plate 8. Lines 16 and 18 correspond to the polarization planes of the linearly polarized light beams transmitted through the surface 12a and designated by the two lines 10b and 11b. Lines 17 and 19 correspond to the polarization planes of the linearly polarized light beams transmitted through the surface 12b and designated by the lines 10a and 11a. Inasmuch as both the light beams 10a and 11b corresponding to the lines 16 and 17 are derived from the same stereo picture 3b, but differ from one another by being out of phase by an angle of 90° and by virtue of the fact that they vibrate in planes which are perpendicular to one another, before entering the quarterwave plates 7, 8, the rotation imparted to the vibration planes of these beams 10b, 10a by the quarter wave plates 7, 8 is sufficient to cause said vibration planes to rotate in the same direction so that when the beams 10b, 10a have passed the plates 7, 8, they are circularly polarized in the same direction. It will of course be realized that the optical axes of the quarter wave plates need not form a precise 45° angle with the planes of the linear polarized light used. When the angle does differ from 45°, however, the relationship of the final beams is such that they are not circularly polarized but are elliptically polarized. Inasmuch as the circular polarization procedure shown in detail in Fig. 5 is substantially the same as Fig. 4, it is not considered necessary to describe it in detail. Because the polarization planes 18, 19 of the light beams 11b, 11a which are linearly polarized after passing the polarizer 5, are perpendicular to the polarization planes 16, 17 of the light beams 10b, 10a, the quarter-wave plates 7, 8 circularly polarize both the light beams 11b, 11a in a direction which is opposite to the direction of circular polarization of the light beams 10b, 10a. For instance, the light beams 10a, 10b coming from the stereo picture 3b are circularly polarized in a clockwise direction whereas the light beams 11a, 11b coming from the stereo picture 3a are circularly polarized in a counter-clockwise direction.

Returning now to Fig. 1 of the drawings it is seen that the beams 10a, 10b, 11a and 11b having been circularly polarized by the quarter wave plates 7 and 8 enter into reflecting prisms 13a and 14a where they are transmitted to a second set of prisms 13b and 14b, which in turn transmits these beams through lenses 9a and 9b for projecting the stereo images 3a, 3b to a projection screen not shown in the drawings. Means 15 of mechanical nature are provided to adjust angles between the prisms 13a and 13b and 14a and 14b so that all the beams of light transmitted coincide upon the projection screen employed.

The modified polarizer construction shown in Fig. 2 differs from the construction shown in Fig. 1 in that the polarizing surface having an angle of 55°, as pictured, to the optical axes of the whole system so as to obtain the maximum of polarization. The polarizers shown here have two entrance surfaces 22a and 22b, and totally mirrored reflecting surfaces 23 and 24. The paths of the individual light beams are shown in the same manner in which they are pictured in Fig. 1.

A similar polarizer construction as seen in Fig. 2 is shown in Fig. 3 in a diagrammatic representation. Here not only the surfaces 12a, 12b, but also the surfaces 22a, 22b of the polarizer are provided with quarter-wave plates 7, 8 so that the polarizer shown in Fig. 3 may be alternatively used in a manner as shown in Fig. 2 and also in such a manner that the surfaces 12a, 12b are the entrance surfaces and the surfaces 22a, 22b are the exit surfaces of the polarizer for the light passing said polarizer.

Further it is possible to project the stereo pictures 3a, 3b only by using either the light beams 10a, 11a or the light beams 10b, 11b and by using only one of the objectives 9a, 9b. In that case the stereo pictures may also be projected by linearly polarized light without using the quarter-wave plates 7, 8. Then a loss of projection light cannot be avoided.

It will be apparent to those skilled in the art that the present invention is capable of a variety of modifications besides those specifically indicated, and that it can be employed quite easily and conveniently to project stereo-images which can be viewed with polarizing glasses. The invention can be employed with either still or moving pictures. For these reasons the present invention is not to be considered as limited except by the scope of the appended claims.

What is claimed is:

1. A device for projecting stereo pictures comprising a source of light, a pair of stereo images, means for mounting said stereo images in the path of light beams from said source, an interference polarizer disposed adjacent said images for polarizing said light beams after they have passed through said images, said polarizer including a polarizing layer capable of splitting a light beam into two differently polarized light beams, one of said polarized beams being transmitted and the other of said polarized beams being reflected by said layer, said layer extending obliquely completely across the light beams passing through one of said stereo images which fall upon one surface of said layer, said interference polarizer also including a reflecting means extending obliquely completely across the light beams passing through the other of said stereo images and disposed relative to said layer so that said last-mentioned light beams fall upon the other surface of said layer and the transmitted rays of the light beams falling upon said one of said surfaces of said layer and the reflected rays of the light beams falling upon said other of said surfaces are superimposed upon each other at said polarizing layer, and projecting means disposed in the path of said superimposed light rays.

2. A projection device as set forth in claim 1 wherein said polarizing layer of said interference polarizer is positioned with respect with the optical axis of the system so that it is met by the incident beams at both sides of said layer at the angle of optimum polarization.

3. A projection device as set forth in claim 1 wherein said interference polarizer has an additional reflecting means disposed parallel to said first reflecting means with said layer disposed between said reflecting means, said polarizer thereby having two exit surfaces with each of said exit surfaces being passed by a pair of said superimposed linearly polarized light rays, and wherein a projecting means is positioned adjacent each of said exit surfaces.

4. A projection device as set forth in claim 3 wherein fractional-wave plates are positioned adjacent to the exit surfaces of said polarizers, said fractional-wave plates being disposed relative to said exit surfaces and to each other to circularly polarize said light rays coming from one stereo image in a clockwise direction and said parts of the light rays coming from the other stereo image in a counter-clockwise direction.

5. A projection device as set forth in claim 4 wherein additional reflecting means are provided in the path of the light rays coming from said polarizer and movable means are provided to support said additional reflecting means for adjusting the angles between said additional reflecting means and said light rays so that the images coming from said polarizer coincide upon a projection screen.

6. A projection device as set forth in claim 4, wherein said fractional-wave plates positioned adjacent to said two exit surfaces of said polarizer are comprised of quarter-wave plates to circularly polarize said linearly polarized light rays transmitted through said exit surfaces, the optical axes of said quarter-wave plates being disposed at an angle of 90° with respect to each other, and said optical axes being disposed at angles of 45° with respect to the polarization planes of said linearly polarized light rays.

References Cited in the file of this patent

UNITED STATES PATENTS

| | | |
|---|---|---|
| 2,106,752 | Land | Feb. 1, 1938 |
| 2,241,041 | Sauer | May 6, 1941 |
| 2,403,731 | McNeille | July 9, 1946 |
| 2,437,061 | Wright | Mar. 2, 1948 |
| 2,449,287 | Flood | Sept. 14, 1948 |
| 2,476,014 | Wright | July 12, 1949 |

FOREIGN PATENTS

| | | |
|---|---|---|
| 519,488 | Great Britain | Mar. 28, 1940 |

U. S. DEPARTMENT OF COMMERCE
PATENT OFFICE

CERTIFICATE OF CORRECTION

Patent No. 2,811,077                                      October 29, 1957

Kurt Franz Gustav Wiemer et al.

It is hereby certified that error appears in the printed specification of the above numbered patent requiring correction and that the said Letters Patent should read as corrected below.

Column 1, line 20, for '"Polariod."' read -- "Polaroid." --; line 21, for "viewed utilizing" read -- viewed by utilizing --; line 55, for "on to" read -- onto --; column 2, line 25, for "passing" read -- after having passed --; line 31, for "against" read -- to --; line 67, for "11b" read -- 10b --; column 4, lines 10 and 11, for "which fall" read -- and falling --; line 39, for "polarizers" read -- polarizer --.

Signed and sealed this 1st day of April 1958.

(SEAL)
Attest:

KARL H. AXLINE                                            ROBERT C. WATSON
Attesting Officer                                     Commissioner of Patents